United States Patent [19]

Halene et al.

[11] 4,446,111
[45] May 1, 1984

[54] VESSEL FOR USE IN HYDROGEN/HYDRIDE TECHNOLOGY

[75] Inventors: Clemens Halene, Dusseldorf; Karl-Ludwig Strack, Herne; Ernst Lange, Langenfeld; Franz-Josef Henrichs, Verl, all of Fed. Rep. of Germany

[73] Assignee: Mannesmann AG, Mannesmannufer, Fed. Rep. of Germany

[21] Appl. No.: 392,007

[22] Filed: Jun. 25, 1982

[30] Foreign Application Priority Data

Jun. 25, 1981 [DE] Fed. Rep. of Germany ....... 3125276

[51] Int. Cl.³ ........................... B01J 8/04; B01J 20/06
[52] U.S. Cl. ..................................... 422/200; 55/158; 55/208; 206/0.7; 422/202; 422/233; 422/243
[58] Field of Search ............... 422/188, 200, 201, 233, 422/243; 55/68, 158, 208; 206/0.7

[56] References Cited

U.S. PATENT DOCUMENTS

| 2,937,079 | 5/1960 | van Pool | 422/201 |
| 4,135,895 | 1/1979 | Kraus | 55/208 X |
| 4,270,360 | 6/1981 | Nakane et al. | 206/0.7 X |
| 4,311,232 | 1/1982 | Klatt et al. | 206/0.7 |
| 4,343,770 | 8/1982 | Simons | 206/0.7 X |
| 4,367,079 | 1/1983 | Wallsten | 55/208 |
| 4,383,606 | 5/1983 | Hunter | 206/0.7 |

FOREIGN PATENT DOCUMENTS 2558690 7/1977 Fed. Rep. of Germany .

Primary Examiner—Robert L. Lindsay, Jr.
Attorney, Agent, or Firm—Ralf H. Siegemund

[57] ABSTRACT

A tubular container is traversed axially by a gas tube the interior of which is continued beyond the end enclosure of the container. The gas tube is provided with apertures filled with metal wool and closed by a compacted ceramic wool plug. The interior of the container is compartmentized by a plurality of bulk head like annular partitions each having a cylindrical inner flange and a cylindrical outer flange, whereby the inner flanges sit tightly on the gas tube and the outer flanges bear tightly against the inside wall of the tubular container. A single vessel may be traversed by heat exchange tubes, or a bundle of such vessels may be immersed in heat exchange fluid.

6 Claims, 2 Drawing Figures

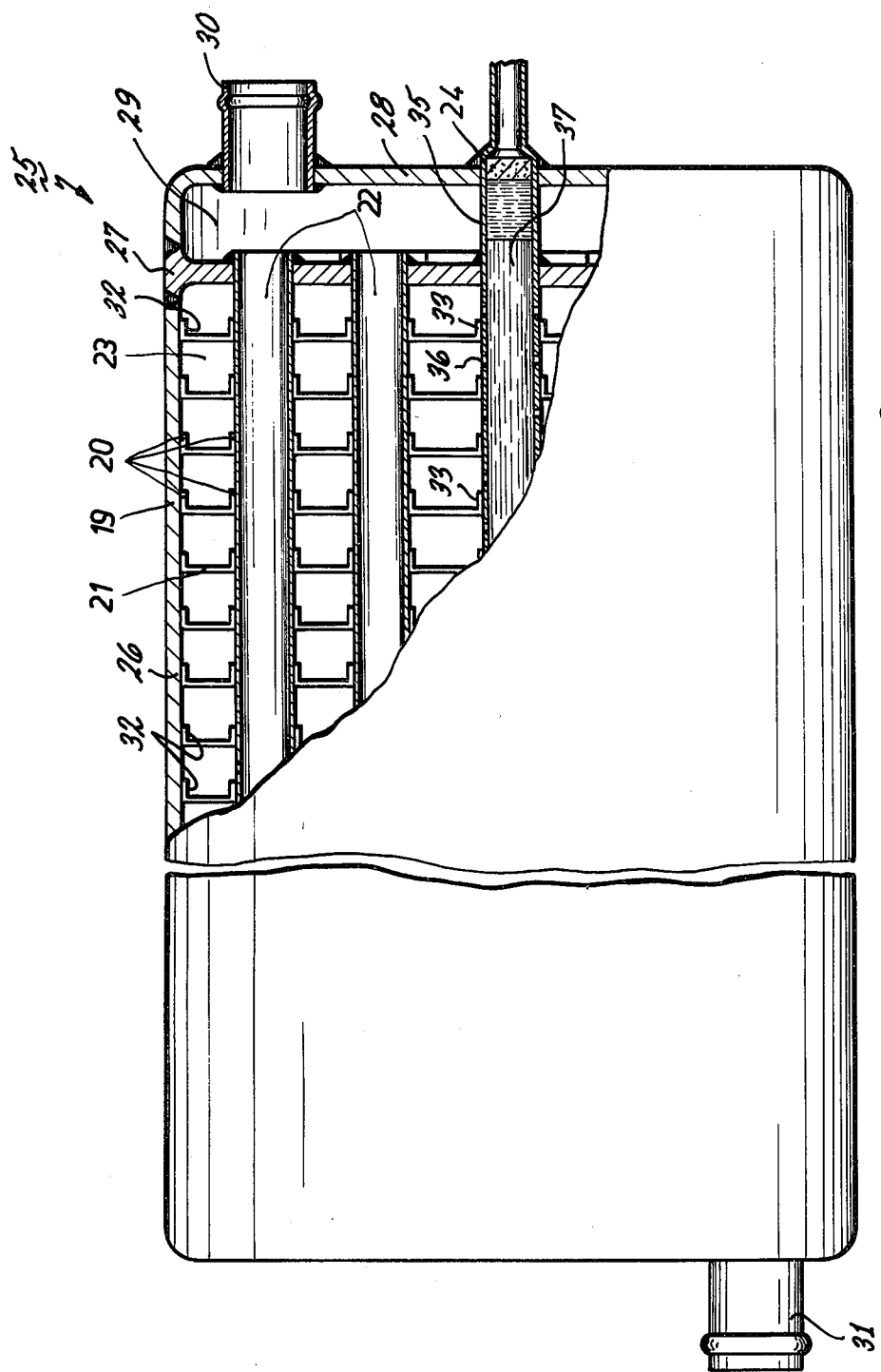

VESSEL FOR USE IN HYDROGEN/HYDRIDE TECHNOLOGY

BACKGROUND OF THE INVENTION

The present invention relates to a pressure vessel for use in hydrogen technology and involving particularly the storage of gases having resulted from or accompanying certain reactions as they occur in energy storage systems using exothermic and endothermic reactions and hydride technology generally.

Hydrogen storage vessels are known which are particularly provided for receiving certain metals and compounds of such metals as they are used for the purpose of storage of hydrogen by means of reaction products. These storage vessels are usually of tubular construction. In operation these tubes are situated within the flow field of a heat exchange medium; alternatively, a heat exchange medium passes through a conduit system which is contained in the interior of the vessel referred to above. As a consequence of these operations, reactions occur corresponding to loading or unloading.

The known devices and vessels are disadvantaged by the fact that considerable volumn portions are inherently rather far from the outer wall of the vessel or from the internal heat exchange tube system so that the resulting absorption and desorption is not sufficiently effective to produce the desired intense cooling or heating as the case may be. These disadvantages have been avoided by choosing a diameter for the tubular vessel which is below 30 millimeters. As a consequence, a rather large area becomes available for heat exchange purposes; in other words, the surface to volumn ratio is improved and loading and unloading times are correspondingly improved. However, making vessels of such a small and smaller diameter is rather expensive. This becomes particularly noticable if tubular containers of this type are bunched or bundled, because in addition to the manufacture of a large plurality of relatively small vessels, one needs a rather complicated and expensive manifold and gas collecting system.

Another basic disadvantage inherent in the known system, results from the particular geometry involved and here with regard to the arrangements of the individual vessels. In other words, the particular heat transfer geometry of these systems is poor in general, which becomes particularly noticable during the individual loading and unloading processes. Generally speaking, metal powder is a poor heat conductor. Metal powder portions located directly at heat exchange surfaces are, of course, in relative good heat exchange relation therewith. However, metal powder disposed more in the interior of the vessel operate with significantly reduced efficiency as far as thermo conduction and interaction is concerned. Thus, loading and unloading of these volumn portions run on a considerable enlarged scale. For this reason, it has been a part of the state of the art of hydride stores in general to mix the storage and reactant metal powder with additives that enhance thermo conductivity. By way of example, the particular reacting metal powder was mixed with aluminum powder, for example, by 5 to 10 percent. Since a matrix is formed, the effect is indeed significant to some extent. However, a sizable portion in volumne is lost as far as active material is concerned. Moreover, it was observed that the powder may separate so that locally, again, poor thermo conduction conditions prevail.

Another infavorable aspect of the known hydride storage vessels, particularly in the case of a tubular configuation of the individual vessel portions is to be seen in that the possibility cannot be excluded that the metal powder in the interior dislodges in parts and local variations in densities occur. In particular, there may be portions in which the powder is present in relative dense configuration, while in other portions of the vessel there are cavities. In view of a contemplated employment in the field of motor vehicles one has to consider shaking and shocks which will detrimentally influence the many loading and unloading processes. It may occur, for example, that the powder filling forms gaps and separates temporarily from the interior surface of the tubular vessel. Accordingly, the heat transfer between powder and the particular wall is drastically reduced. Moreover, unwanted local compressions may result in bulging of the vessel even up to rupture which, of course, is a danger that may cause accidents. See here, for example, Phillips research supplement 1976 Volume 1 Page 26, and here particularly FIG. 2.7.

German patent application No. 2,558,690 proposes an improved heat exchanger and container having a circular cross section and tapering in steps or continuously in the direction of gas flow, the gas flow being either subjected to a circulation process of energy of a transverse flow. It must be expected that the resulting interaction is matched to the thermocharacteristic of the process. However, it was found that this approach is not only very expensive, but again, the available volume and enclosed space is insufficiently utilized.

Certain containers have been constructed with a view on equalization of the hydrogen discharge flow and particularly for use in high temperature storage facilities using waste heat or heat from discharged exhaust gas, having a temperature between 300 and 700 degrees centigrade. These constructions include tubular individual containers which are in heat exchange relation with exhaust gases flowing transversely to the axis of the tubes, whereby in addition a cascading arrangement is provided for. This particular approach intends to provide a locally limited but highly effective and concentrated heat transfer into the system. However, the a symmetry of the heat flow results in thermally induced tensions within the solid parts of the system leading in turn to local deformation and ultimately distruction of container facility.

It is furthermore known, that the storage masses of the type used in hydride technology, can be divided or atomized by means of hydrogen with a particle size below 1 micrometer. If one uses such a material, the danger results that upon extraction of hydrogen, some of the material is carried along and may interfer with the function of other parts, such as the engine of the vehicle of which this hydride storage is a part. In order to eliminate this danger one has tried to use sintered metal filters. This approach, however, offers the disadvantage that powdery material sooner or later clogs the filter and interfers and finally blocks the flow of gas.

DESCRIPTION OF THE INVENTION

It is an object of the present invention to provide a new and improved pressure vessel for utilization in hydrogen/hydride technology including the storage and release of hydrogen on the basis of reaction with a solid metal, whereby the vessel is to have a high specific storage capability, be of low weight, operate fast and highly effective as far as loading and unloading i.e. gas absorbtion and release is concerned, having further a high life and being quite safe; moreover, the pressure vessel should permit standardization and typology for establishing modules to be combined into larger units. Also, the principal involved in constructing such a vessel should permit employment on a stationary basis as well as in mobile equipment.

In accordance with the preferred embodiment of the present invention, it is suggested to provide such a vessel in the form of a tubular pressure proof container being traversed axially by a gas tube the interior of which is to be continued beyond the end enclosure of the container. Moreover, the gas tube is provided with apertures, is filled with metal wool and has a ceramic wool plug of compacted consistency for closing the tube except for a clean gas flow through; the interior of the pressure proof container is partitioned by a plurality of bulk head like annular partitions each having a cylindrical inner flange and a cylindrical outer flange, the partitions are arranged along the axis of the container for compartmentizing the interior there of, whereby the inner flanges tightly sit on the gas tube and the outer flanges bear tightly against the inside wall of the tubular container. The vessel is preferably provided with some means impeding any tendency of destruction as a result of high temperatures, this may include particularly special provisions for high melting walls defining a compartment and it may include, alternatively or in addition, local storage for fire extinguishing means. The partitions prior to insertion may be physically combined with pellets of compressed powder constituting the reactive medium for the high dried process. The invention can be practiced, for example, by utilizing a single vessel with a central gas tube, and a heat exchange medium is passed eccentrically through the compartmentized space outside the gas tube. Alternatively, one may have a bundle of vessels within a common heat exchange medium and central tubes for each vessel, the tube, being manifolded.

DESCRIPTION OF THE DRAWINGS

While the specification concludes with claims, particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 illustrates another embodiment for practicing the best mode of the invention under different conditions of heat exchange.

Proceeding now to the detailed description of the drawings, FIG. 1 illustrates several tubular pressure vessels or containers each including a tube 1 proper, a rear closure cap 2 and a front closure cap 3, to completely close and seal the vessel. Bulk head like annular partitioning elements 5 divide the tubular vessel into a plurality of annular compartments 4 which contain the active hydride material metal powder such as FeTi. The partions 5 have outer cylindrical flanges 6 and inner cylindrical flanges 7. The outer flanges 6 are urged and pressure forced against the inner wall of tubular container 1. The inner flanges 6 all urge against and sealingly engage the outer wall of a gas tube 8.

Figure 1:
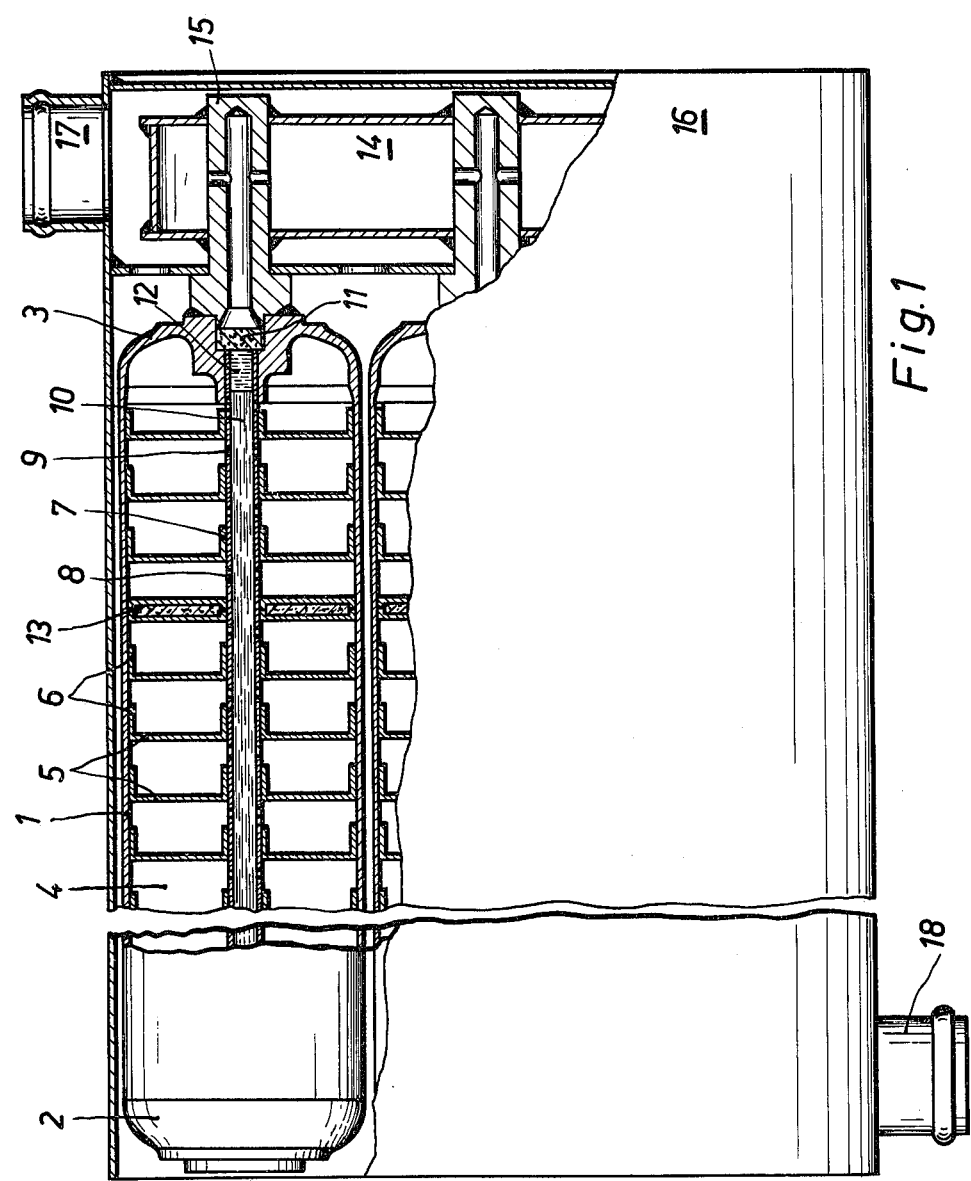
FIG. 1 is a cross section through a pressure vessel and container system constructed in accordance with the preferred embodiment of the present invention for practicing the best mode thereof.

Gas tube 8 is provided with radially or transversely oriented bores 9 leading into the compartments 4. Moreover, the gas tube 8 is filled with metal wool 10 over its entire length. One end of the tube 8 is contained in the cap 3 and a plug is partially closed by 12 made of highly compressed ceramic wool. A sintered filter disc 11 is disposed next to plug 12.

Reference numeral 13 refers to a flat annular hollow disc, which is also disposed on the tube 8 and contains a very fine grain sand. Only one of such flat containers is shown, but there are several arranged along the extension of tube 1. These hollow disks function also as partitions, in addition to being reservoirs for sand; they are provided as a safety feature against fire.

Several of these containers 1 are gas conductively connected to a manifold and gas collection chamber 14 there being gas connecting nipples 15 provided which communicate on one hand with the interior of the chamber 14 by means of external ducts, while axially they are gas ducts that end at the respective filter 11.

The entire arrangement is enclosed in a jacket 16 and inlet and outlet nipples 17 and 18 respectively are provided in the outer jacket 16. The heat exchange gas flows into the jacket through nipple 17 flows around the various tubular containers and emerges from the exit nipple 18.

The outer surfaces of the partitions 5, at least to the extent, they are exposed to the interior of the compartments 4 are preferably plated or otherwise coated with a metal layer or coating not exceeding 60 micrometers having a very high thermal conductivity. One may use aluminum for this purpose. These layers or coatings will enhance the immediate exchange of thermal energy i.e. the heat flow between the interior of the compartment and the respective bulk head. The other surfaces being exposed to the interior of active material containing compartments may also be covered with such a layer and this includes the inside wall of tube 1, as well as the outside wall of tube 8. Of course, it also includes the metal portions of the particular partition 13, as well as flanges such as 6 and 7.

A single tubular container type hydride store is shown in FIG. 2. A reference numeral 25 refers to an outer jacket which is also the pressure vessel proper. The particular vessel is divided into a central cylindrical portion 26 and an intermediate wall 27 is welded to that envelope 26 and to an outer cap 28. The other end of the arrangement is constructed analogously. The end cap 28 together with the partition 27, establishes a plenum 29 into which leads a nipple 30 being either an inlet or an outlet. The chamber 29 communicates with a plurality of eccentrically disposed tubes 27 which traverse the interior of the cylindrical chamber 26 and lead toward a gas plenum and manifold chamber at the other end which is connected to another nipple 31 being, for example, the outlet for heat exchange fluid.

This particular system includes a central pipe or tube 35 which is likewise filled with metal wool 37 and thus compares with the individual tubes 8 in the systems shown in FIG. 1. The tube 35 is provided with a plurality of apertures 36 communicating with individual chambers. In this particular case the chambers are defined by a system of bulk head sheets or partitions 27 being basically of an annular configuration and, in each instance, extend around the central tube 25. In addition, each of these bulk heads have openings for receiving the individual tubes 22.

Each of the bulk heads, partitions or sheets 21 has an outer annular cylindrical flange 32, which bears against the inside wall of the cylindrical, tubular container wall 26; and each of these sheets 21 includes a central annular cylindrical flange 33 bearing against the outside of the tube 26. In addition, however, there are provided individual annular flanges to bear against the outside of the respective tubes 22. These tubes 22, of course, pass the cooling or heating medium as the case may be and as it flows from nipple 30 to nipple 31.

Reference numeral 24 generally refers to a plug system in tube 35, analogous to the one described above and includes again a compressed plug element of ceramic wool, as well as a sintered disc. The particular gas collection and reservoir is connected to that unit on the outside of plug 24 and is not shown.

The pressurized vessels and storage arrangements as illustrated in these two figures have a number of significant advantages. These advantages include the following:

The particular bulk head and compartment dividing and partitioning sheets (5 and 21) are tensioned and they prevent positively axial separation of the active, powdery material which is included in the several compartments, such as 4 and 23. This is particularly important if the powder contains certain additives. Of course, a minimum of separation may occur within any individual compartment; however, this is of minor importance, because the relative separation and degree of demixing is quite limited due to the smallness of the compartments, compartment size, constitutes a significant parameter by means of which the separation can be controlled.

Another advantageous feature of the illustrated arrangement, is that in that these bulk heads and separating or partitioning sheets perform a significant function in a case of rupture, breakage or the like, as it may happen in an accident. In such an unfortunate circumstance, the bulk heads prevent that the easily inflamable hydrogen will carry along the powder particle from the interior of the vessel which are present in a pyrophoric state due to atomization. Moreover, the particular bulk head and partitioning arrangement when supplemented with fire extinguishing means, such as shown in the particularly constructed portions 13, alleviates the danger of fire. One may also construct the partitions of high melting metal.

The partitioning of the overall reaction chamber permits, in addition, a more economical way of handling the reaction powder, namely one may provide the power in more or less slightly compressed, stable pellets. Moreover, the sheets may actually be combined in a physical manner with such pellets and thereby render these pellets less prone to breakage. Also, such an arrangement facilitates filling the individual chambers with active material.

Another advantage of the separating sheets and bulk head is that they participate and contribute directly and indirectly in the heat exchange process in both, the radial and axial directions. Thus, these partitions intensify the heat exchange process. In addition, the heat exchange process is rendered more uniform throughout the reaction material as a whole, which is highly beneficial with regard to the thermal load on the container wall. In this case then a cylindrical volumne arrangement of storage and active material is highly beneficial.

If the heat exchange medium which is fed into the system through nipple 17 or 30, as the case may be, is high temperature exhaust fume of a combustion engine vehicle, then the bulk heads and separator sheets participate more actively in the heat exchange process, particularly with regard to bridging, so to speak, already degassed powder having a rather poor thermal conductivity and this in turn tends to utilize more efficiently active material which is located more remote from any of the heat exchange wall surfaces. Moreover, the particular heat exchange process as enhanced by the separating sheet and bulk head. From a more general point of view, any storage material may for any reason will be in direct contact with the container wall, but any adjacent partition makes sure that the heat exchange process does continue.

A fifth advantage flowing from utilization of these partitioning sheets and bulk heads, is that they enhance generally the gas transport in radial direction which, of course, means a predominant of flow towards or away from the radially directed openings such as 9 or 36. In the case of unloading (de-gass), the powder layers adjoining the bulk head and separating sheets participate to a preferred degree in the process. Thus, flow space is made available and the sheets serve as guide vanes for that flow. It has to be observed that in case of hydrogen release there is a reduction in volume, in that indeed a preferred flow space forms along and adjacent the sheets which in turn means that gas flows preferably in radial direction towards or of a from central gas tube 8 or 35 as the case may be.

A sixth and final advantage of the particular arrangement is to be seen in the gas tube being preferably centrally arranged and containing metal wool which has been forced into the tube. This arrangement prevents the escape of larger particles of the storage medium from the system without impeding gas flow within the vessel. The plug at the end of the gas pipe being of a two-part combination, operates as fine filter whereby particularly the compressed ceramic wool is very instrumental in holding back very small metal powder particles so that the sinter filter acts primarily only as a final safeguard to prevent the migration and carrying along of whatever very fine or ultra fine particles is still suspended in the gas flow. The disc, however, has the additional function of supporting and retaining the ceramic wool plug in order to avoid dislodging thereof by operation of the gas pressure.

We claim:

1. Pressure vessel for use in hydrogen/hydride technology including storage and release of hydrogen on the basis of reaction with a solid metal or metal compound, comprising:

a tubular container having an inner wall and a central axis;

a gas tube disposed in and along the central axis and being continued beyond one end closure of the container, the tube having apertures; and a plurality of bulk head like annular partitions each having a cylindrical inner flange and a cylindrical outer flange, the partitions being arranged along the axis for compartmentizing the interior of the container and circumscribing the gas tubes;

the inner flanges tightly sitting on the gas tube, and the outer flanges being tensioned for tightly engaging the inner wall of the container, so as to seal the several compartments as provided by the compartmentizing, the interior of the gas tube communicating with the respective compartments through the apertures.

2. Pressure vessel as in claim 1, at least one of the partitions being hollow to include fire extinguishing means.

3. Pressure vessel as in claim 1, at least some of the partitions being made of a very high melting metal.

4. Pressure vessel as in claim 1, the partitions being physically combined with pellets serving as active storage medium in the vessel.

5. Pressure vessel as in claim 1, the gas tube having a plurality of apertures leading into compartments as defined between adjacent ones of the partitions, the gas tube being filled with metal wool, further including a compacted ceramic wool plug closing the gas tube.

6. Pressure vessel as in claim 1, the partitions as compartmentizing the interior of the container defining a plurality of compartments accordingly, the compartments being respectively bounded by surfaces, at least some of the surfaces being coated with a metal coating having a very high thermal conductivity and a thickness not exceeding 60 micrometers.

* * * * *